United States Patent
Moake

(10) Patent No.: US 9,982,534 B2
(45) Date of Patent: May 29, 2018

(54) DOWNHOLE SYSTEMS FOR COMMUNICATING DATA

(71) Applicant: Halliburton Energy Services, Inc., Houston, TX (US)

(72) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/029,226

(22) PCT Filed: Nov. 14, 2013

(86) PCT No.: PCT/US2013/070106
§ 371 (c)(1),
(2) Date: Apr. 13, 2016

(87) PCT Pub. No.: WO2015/073004
PCT Pub. Date: May 21, 2015

(65) Prior Publication Data
US 2016/0258289 A1 Sep. 8, 2016

(51) Int. Cl.
| | |
|---|---|
| *E21B 49/00* | (2006.01) |
| *G01V 5/04* | (2006.01) |
| *E21B 47/18* | (2012.01) |
| *E21B 47/12* | (2012.01) |
| *E21B 47/024* | (2006.01) |
| *G01V 11/00* | (2006.01) |

(52) U.S. Cl.
CPC .......... *E21B 49/00* (2013.01); *E21B 47/024* (2013.01); *E21B 47/12* (2013.01); *E21B 47/18* (2013.01); *G01V 5/045* (2013.01); *G01V 11/002* (2013.01)

(58) Field of Classification Search
CPC .......... E21B 49/00; E21B 47/18; E21B 47/12; E21B 49/003; G01V 5/045
See application file for complete search history.

(56) References Cited

U.S. PATENT DOCUMENTS

| | | |
|---|---|---|
| 6,315,062 B1 | 11/2001 | Alft et al. |
| 6,405,135 B1 | 6/2002 | Adriany et al. |
| 6,405,136 B1 | 6/2002 | Li et al. |
| 7,028,409 B2 | 4/2006 | Engerbretson et al. |
| 7,558,675 B2 | 7/2009 | Sugiura |
| 8,024,121 B2 | 9/2011 | Tang |
| 8,050,866 B2 | 11/2011 | Jacobson |

(Continued)

FOREIGN PATENT DOCUMENTS

WO 2012116320 8/2012

OTHER PUBLICATIONS

International Search Report and Written Opinion of PCT Application No. PCT/US2013/070106 dated Aug. 11, 2014:pp. 1-12.

*Primary Examiner* — Mohamed Charioui
*Assistant Examiner* — Jeremy Delozier
(74) *Attorney, Agent, or Firm* — Chamberlain Hrdlicka

(57) ABSTRACT

Systems and methods are presented for communicating data representing formatted characteristics of a borehole from a downhole location to a surface location. A sensor array downhole produces a first data set from which a plurality of coefficients for use in a one-dimensional angular function are determined. The coefficients are transmitted to the surface to allow a second data set to be prepared representing the first data set. Other systems and methods are presented.

20 Claims, 10 Drawing Sheets

(56) References Cited

U.S. PATENT DOCUMENTS

| | | |
|---|---|---|
| 8,321,132 B2 | 11/2012 | Moake |
| 8,788,206 B2 * | 7/2014 | Tang ................... G01V 11/00 702/6 |
| 2005/0018192 A1 | 1/2005 | DiFoggio et al. |
| 2008/0120035 A1 | 5/2008 | Hassan et al. |
| 2008/0283252 A1 | 11/2008 | Guiguard et al. |
| 2008/0294343 A1 * | 11/2008 | Sugiura ................ E21B 47/022 702/6 |
| 2011/0220410 A1 | 9/2011 | Aldred et al. |
| 2012/0024606 A1 | 2/2012 | Pirovolou et al. |
| 2012/0273270 A1 | 11/2012 | Rasheed |
| 2013/0049981 A1 | 2/2013 | MacPherson et al. |
| 2013/0080063 A1 | 3/2013 | Pillai et al. |

\* cited by examiner

US 9,982,534 B2

DOWNHOLE SYSTEMS FOR COMMUNICATING DATA

TECHNICAL FIELD

The present disclosure relates generally to oilfield drilling and production, and more particularly, but not by way of limitation, to systems and methods for communicating information from a downhole location to a surface location.

BACKGROUND

Drilling and production operations are improved with greater quantities of information relating to the conditions and drilling parameters downhole. The information is, at times, obtained by removing the drilling assembly and inserting a wireline logging tool. With great frequency today, information is obtained while drilling with measurement while drilling (MWD) or logging while drilling (LWD) techniques. Often while drilling, operators would like to know the direction and inclination of the drill bit, the temperature and pressure of the borehole, formation characteristics of the borehole, etc. To obtain this information, sensors and detectors are used downhole. Yet, one challenge is to get the information—or at least a portion of it—to the surface during operations.

To this end, a number of techniques have been developed. For example, in pulse telemetry, acoustic pressure signals are created and sent through the drilling fluid. Still, issues and shortcomings exist with this and similar techniques due to the low bandwidth available for information exchange.

DETAILED DESCRIPTION OF ILLUSTRATIVE EMBODIMENTS

Figure 1:
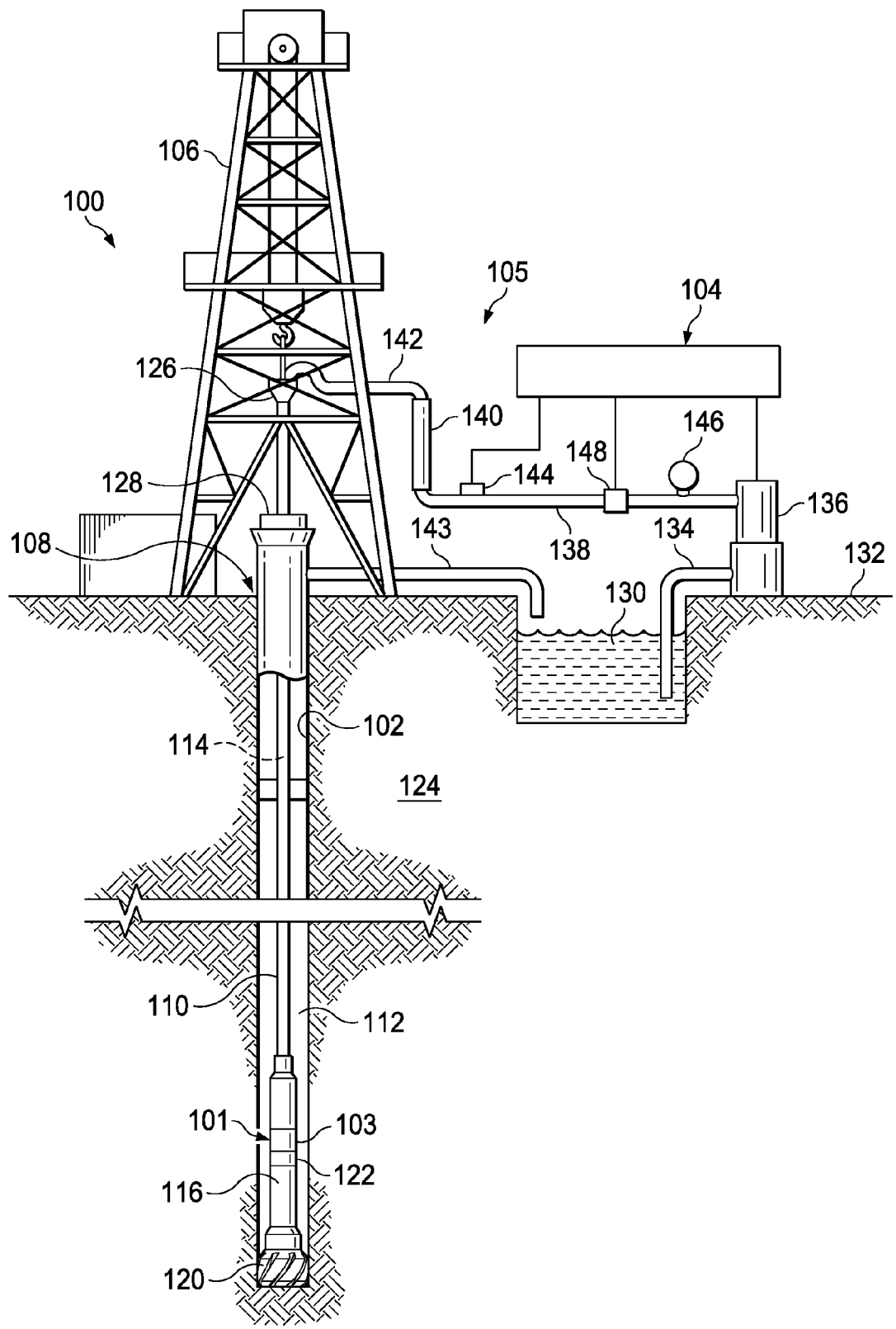
FIG. 1 is a schematic, elevational view with a portion of a formation shown in cross-section showing a system for communicating data representing formation characteristics of a borehole from a downhole location to a surface location.

In the following detailed description of the illustrative embodiments, reference is made to the accompanying drawings that form a part hereof These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

In the drawings and description that follow, like parts are typically marked throughout the specification and drawings with the same or coordinated reference numerals, respectively. The drawing figures are not necessarily to scale. Certain features of the invention may be shown exaggerated in scale or in somewhat schematic form and some details of conventional elements may not be shown in the interest of clarity and conciseness.

The embodiments described herein relate to systems, tools, and methods for communicating data representing formation characteristics of a borehole from a downhole location to a surface location. In one illustrative embodiment, a system is disclosed that measures a formation property along an angular sweep of the borehole to produce a first data set. The first data set characterizes the formation property along the sweep at a particular plane or area. A computational unit conducts a regression analysis on (described further below) the first data set using a predetermined, one-dimensional angular function to determine a plurality of coefficients. A telemetry unit then transmits the plurality of coefficients to the surface location. The coefficients as used herein may also include related data such as reference angles. The surface location may have a surface unit to receive the coefficients, and with the predetermined one-dimensional angular function, produce a second data set representing the first data set. Because the plurality of coefficients is smaller than the first data set, the telemetry unit is capable of efficiently utilizing the transmission bandwidth between the downhole location and the surface location. Other systems, tools and methods are presented.

Efficient utilization of transmission bandwidth is advantageous in pulse telemetry where the transmission of data sets is constrained by the low bandwidths available (e.g., typically less than 40 bits/s). The embodiments presented herein utilize one-dimensional angular functions that have been predetermined for use with the angular distributions of the formation properties of interest. A regression analysis occurs in single variable phase space (i.e., angular) and proceeds according to a "curve fitting" process. This approach stands in contrast to methods where data in one variable phase space must first be represented in another variable phase space before manipulation can begin (e.g., Fourier transforms, data compression, codec algorithms, etc.). While several embodiments in this disclosure are presented in the context of pulse telemetry, such presentation is not intended as limiting.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The various characteristics mentioned above, as well as other features and characteristics described in more detail below, will be readily apparent to those skilled in the art with the aid of this disclosure upon reading the following detailed description of the embodiments, and by referring to the accompanying drawings.

Referring now to the drawings, FIG. 1 is a schematic, elevational view with a portion of a formation depicted in cross-section showing a well system 100 with communication system 101 for communicating data representing formation characteristics of a borehole 102 from a downhole location 103 to a surface location 105. The surface location 105 includes a surface unit 104 as will be described further below. The well system 100 includes a derrick 106 that is positioned over a well 108 with its borehole 102. A drillpipe 110 is disposed within the borehole 102. The space between the borehole 102 and an exterior of the drillpipe 110 defines an annulus 112.

The drillpipe 110 includes a central passageway 114 that defines an interior portion of the drillpipe 110. A borehole assembly 116, which includes a drill collar, is coupled to a drill bit 120 and is coupled to or includes the drillpipe 110. The borehole assembly 116 includes one or more logging tools, detectors, or sensors 122 for developing information about the formation 124 or the drilling process. The one or more sensors 122 includes one or more of the following: gamma ray sensor, azimuthal sensor, borehole pressure sensor, temperature sensor, vibration sensor, shock sensor, torque sensor, porosity sensor, density sensor, resistivity sensor, etc.

The borehole assembly 116 typically includes a directional tool containing for determining tool orientation within the borehole 102. The directional tool may be any device for providing orientation information and may include magnetometers and accelerometers. The directional tool may include one or more processors and one or more memories to determine the angular orientation of the one or more sensors 122. The angular orientation provides a datum against which angular distributions of formation properties are measured by the one or more sensors 122. Sensor angles are measured relative to a reference direction, R. In some embodiments, reference may be straight up and in some embodiments reference may be to north or another direction.

Also disposed downhole and associated with the drillpipe 110 is the communication system 101. The communication system 101 may be formed as part of the borehole assembly 116 or coupled thereto. The communication system 101 includes one or more processors associated with one or more memories and is coupled to one or more logging tools, detectors, or sensors 122 (generally referred to as "a sensor array"). The communication system 101 also includes a telemetry unit (218 in FIG. 2) for transmitting data or instructions to the surface location 105, and in some embodiments, the transmission of data or instructions may include an exchange of data and instructions.

The drillpipe 110 may extend downwardly from an elevator assembly 126, which is suspended from the derrick 106, through a rotary table 128. The rotary table 128 causes the drillpipe 110 to rotate and the drill collar and ultimately the drill bit 120 to rotate. Drilling fluid is circulated to the drill bit 120 to assist with the drilling. For example, the drilling fluid may cool the drill bit 120 and remove cuttings.

A tank 130 stores the drilling fluid at the surface 132. A pipe 134 may be used to move the drilling fluid from the tank 130 through a drilling-fluid pump 136 into a pipe 138 that leads to a standpipe 140. The standpipe 140 is coupled to the drillpipe 110 by a flexible conduit 142. The drilling-fluid pump 136 pulls drilling fluid from the tank 130 and moves the drilling fluid along the pipes/conduits 138, 140, 142 and into the central passageway 114 of the drillpipe 110 to the borehole assembly 116. The drilling fluid passing through the borehole assembly 116 exits proximate to the drill bit 120 and returns to the surface through the annulus 112 and is delivered through the pipe 143 to the tank 130. The drilling fluid in the tank 130 may be reconditioned (cuttings removed and degassed etc.) and reused. It should be noted that the tank 130 may comprise two tanks—one with ready-to-use drilling fluid coupled to the pipe 134 and one for receiving used drilling fluid from the pipe 143.

As discussed previously, the surface location 105 may include a surface unit 104. The surface unit 104 may, amongst other things, receive pressure pulses, or transitions, sent over the drilling fluid in the central passageway 114. The surface unit 104 may include one or more surface sensors or transducers 144. For example, an array of sensors 144 might be spaced for noise cancellation. The transducer 144 is shown on the pipe 138 for sensing the pressure transitions, or pulses, from the communication system 101. Other components such as sensors to assist with noise cancellation or a desurger 146 (to minimize surges from pump 136) or other devices may be included. A valve 148 may be included on the pipe 138 to induce pulses over the drilling fluid in the central passageway 114 to deliver data or instructions from the surface 132 to the communication system 101. The pulses traveling downward may be used to control aspects of the communication system 101.

The surface unit 104 may include one or more processors associated with one or more memories, a detection circuit for uplink communication, and a drive and control circuit for downlink communication. In uplink mode, the detection circuit is operable to receive pressure transitions or pulses from downhole and convert such transitions and pulses into data and instructions compatible with the one or more processors and one or more memories of the surface unit 104. The data and instructions may include a plurality of coefficients that represents formation characteristics of the borehole 102. The one or more processors and one or more memories are operable to carry out steps which may include producing secondary data using the plurality of coefficients and the appropriate equation as will be clear below. In downlink mode, the drive and control circuitry are operable to transmit data and instructions downhole to the communication system 101.

The telemetry unit may be a negative pressure telemetry system or could be a positive pressure system. In the negative pressure telemetry unit, the valves are momentarily opened outside of the drillpipe 110 to create a quick pressure drop, or negative pressure pulse, that propagates through the drilling fluid to the surface unit 104. In a positive system, the valve or valves restrict the flow of drilling fluid for a brief moment to build a pressure pulse that again propagates through the drilling fluid to the surface unit 104.

The telemetry unit may include a drive and control circuit for uplink communication and a detection circuit for downlink communication. In uplink mode, the drive and control circuit is operable to transmit data and instructions uphole. The data and instructions may include a plurality of coefficients that represents formation characteristics of the borehole 102 and, information concerning in at least some embodiments an indication of a particular one-dimensional angular function for which the coefficients apply. The plurality of coefficients is determined by the one or more processors and one or more memories of the communication unit 101 working in conjunction with the sensor array. In downlink mode, the detection circuit is operable to receive pressure transitions or pulses from uphole and convert such transitions and pulses into data and instructions compatible with the one or more processors and one or more memories of the communication unit 101.

Figure 2:
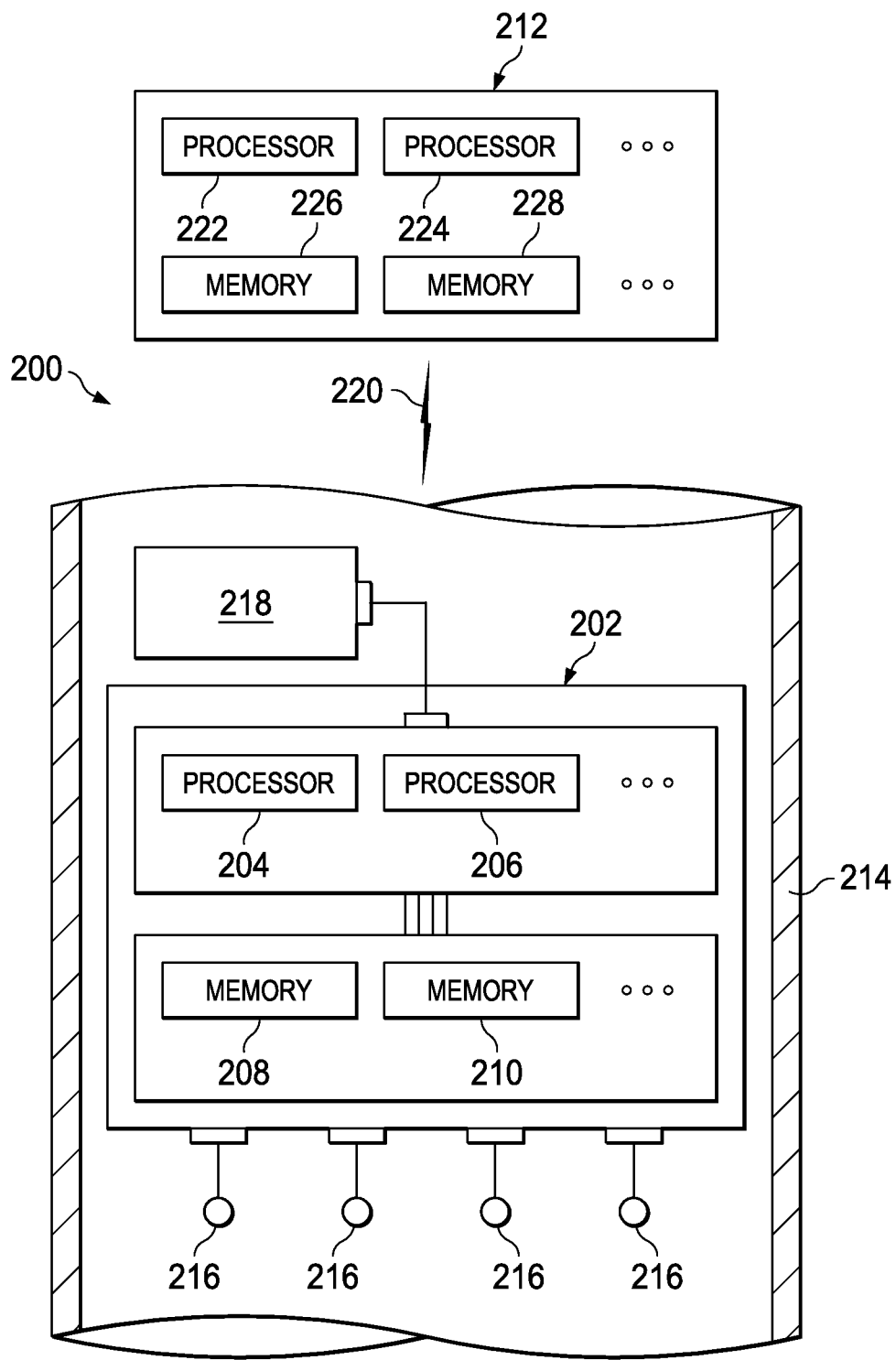
FIG. 2 is a schematic diagram of a computational unit and surface unit for use as an aspect of an illustrative embodiment of a system for communicating data representing formation characteristics of a borehole from a downhole location to a surface location.

Referring now to FIG. 2, a schematic diagram of communication system 200 having a computational unit 202 that includes one or more processors 204, 206 and one or more memories 208, 210 is presented. The communication system 200 may be used as the communication system 101 in FIG. 1. The diagram further presents a surface unit 212, which may be used as surface unit 104 in FIG. 1. The communication system 200 may be coupled to or otherwise associated with a borehole assembly 214. The borehole assembly 214 includes a plurality or array of sensors 216. A telemetry unit 218 is coupled (electrically or wirelessly) to the computational unit 202 for receiving data therefrom and transmitting the data—as suggested by numeral 220—to the surface unit 212.

The borehole assembly 214 provides support for components and may assist with motion within the borehole (e.g., rotational and longitudinal). The sensor array 216 is coupled to the borehole assembly 214 and is operable to measure a formation property along a sweep or path of the borehole. The sweep may be an angular sweep or path or arc length when the borehole assembly 214 is rotated or may be a linear path when the borehole assembly 214 is slid (i.e., moved longitudinally without rotation). The sensor array 216 may be spaced about the borehole assembly 214 to collect borehole data of characteristics of the borehole. The data is delivered from the sensor array 216 to the computational unit 202 where it is stored in the one or more memories 208, 210. The one or more processors 204, 206 and one or more memories 208, 210 of the computational unit 202 are configured to carry out any of a number of operations on the stored data, or first data set, from the sensor array 216.

The sensor array 216 produces the first data set, which characterizes or helps characterize the formation property along the angular sweep and stores the first data set in the one or more memories 208, 210. The computational unit 202 is configured to conduct a regression analysis on the first data set to determine a plurality of coefficients. The plurality of coefficients is generated by applying a predetermined, one-dimensional angular function against the first data set. Coupled to the computational unit 202 is the telemetry unit 218, which receives the coefficients from the computational unit 202 and transmits the plurality of coefficients.

The transmitted data from the telemetry unit 218 is received by the surface unit 212. The surface unit 212 includes one or more processors 222, 224 associated with one or more memories 226, 228. The one or more processors 222, 224 and one or more memories 226, 228 are configured to perform operations on received data 220. For example, the second data set may be prepared using the coefficients and the predetermined, one-dimensional angular function. Thus, even though limited data is transmitted, the entire first data set may be represented. The surface unit 212 is operable to receive the plurality of coefficients from the telemetry unit 210 and produce a second data set representative of the first data set.

Figure 3:
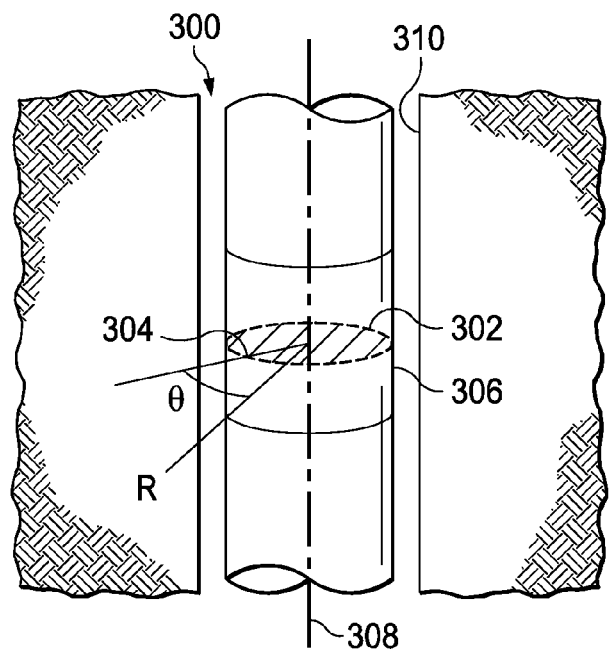
FIG. 3 is a schematic, elevational view, with a portion of a formation shown in cross-section, of an illustrative embodiment of a borehole assembly in a borehole.

Now referring primarily to FIG. 3, a schematic, elevational view of a borehole 300 illustrates one example of an angular sweep 302 along which a formation property is measured by a sensor array 304. The sweep 302 is defined, for any given borehole depth, an arc (typically a 360 degree sweep) on an azimuthal plane 306 within the borehole 300. The azimuthal plane 306 is substantially perpendicular to a longitudinal axis 308 of the borehole 300, which may be vertical, horizontal, or some inclination in between. The sensor array 304 may probe along the sweep 302 in the direction of the borehole wall 310. The angular orientation of the sensor, represented in FIG. 3 by $\theta$, is measured relative to a reference direction, R. The reference direction, R, may be any reference or datum, but it is usually taken to be the gravitational "up" side of the borehole in deviated wells or as magnetic north.

Figure 4A:
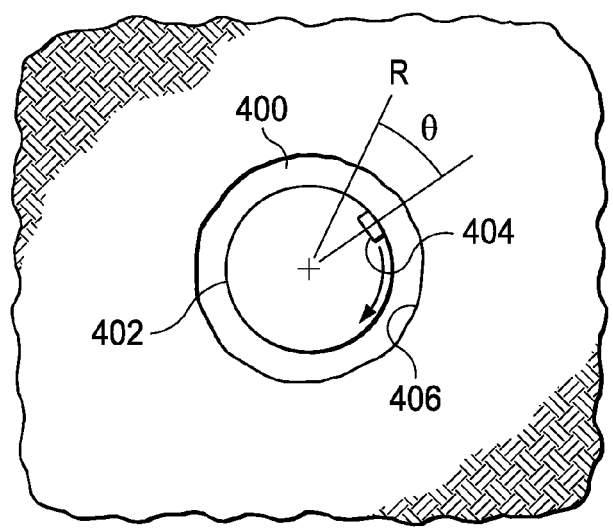
FIGS. 4A and 4B are schematic plan views of a portion of borehole assembly in a borehole.

FIG. 4A depicts a schematic, cross-sectional view of a borehole 400 and a sensor array 402. The sensor array 402 includes an individual sensor 404. In this embodiment, the sensor 404 is rotated to probe about a sweep 406 of the borehole 400 in order to collect a first data set. Data is collected at angles, $\theta$, relative to a reference direction, R. This data may be plotted as described further below.

Figure 4B:
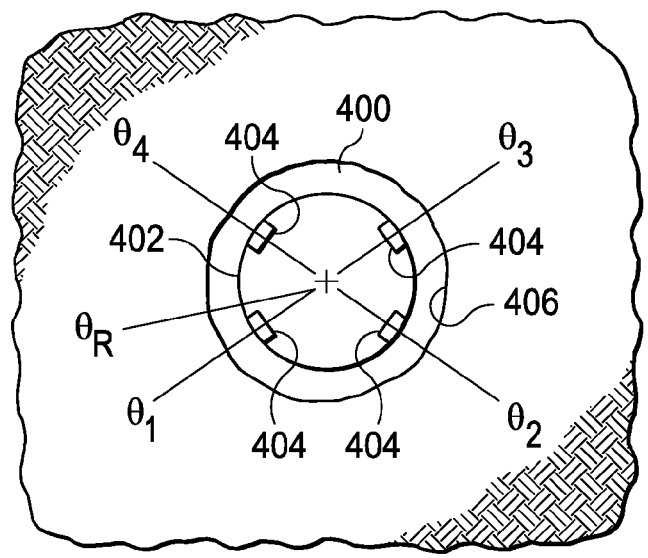

FIG. 4B depicts a schematic, cross-sectional view of a borehole 400 and a sensor array 402. The sensor array 402 includes four sensors 404. In this embodiment, the sensor array 402 is slid longitudinally and the four sensors 404 are substantially fixed in angular orientation while probing a de facto sweep 406 of the borehole 400. Data is collected at four respective angles, $\theta_1$, $\theta_2$, $\theta_3$, and $\theta_4$, corresponding to angular positions of the four sensors 404. The four angles, $\theta_1$, $\theta_2$, $\theta_3$, and $\theta_4$, are measured relative to a reference direction, R. Data so collected forms a first data set. Although presented in the context of four sensors, this embodiment may utilize a different number of sensors, e.g., two, three, five, six, etc., and their positioning may or may not be equispaced.

Figure 5:
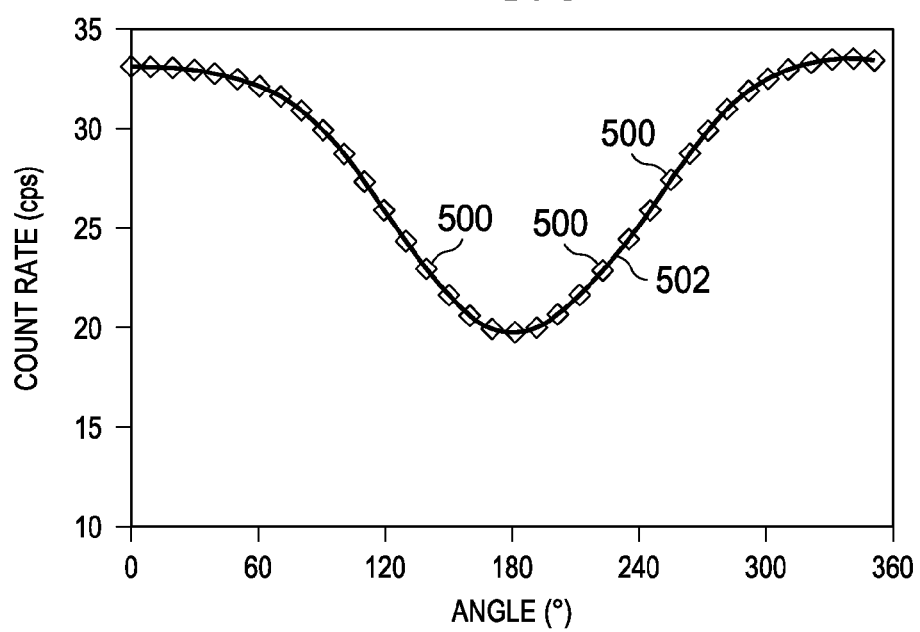
FIG. 5 is a schematic plot of data representing a characteristic of a borehole and having count rate per second (cps) on the ordinate and angle in degrees on the abscissa.
Figure 6:
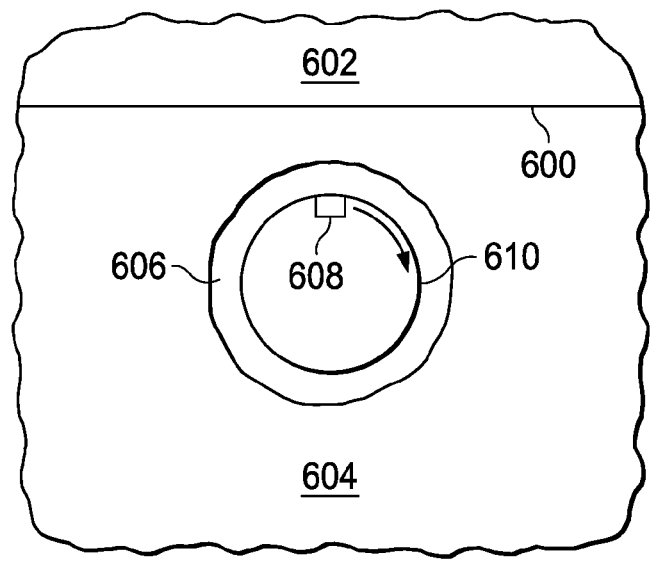
FIG. 6 is a schematic plan view in cross section of a borehole assembly in a borehole comprised of a low-API formation bed and a high API formation bed.

Referring now primarily to FIGS. 5 and 6, simulated data from a borehole and the borehole geometry are presented. With reference to FIG. 6, using Monte Carlo N-Particle (MCNP) software, a gamma sensor is modeled as it rotates in a borehole drilled through a high-API bed. A low-API bed is nearby. A planar bed boundary 600 separates the high-API bed 602 from a low-API bed 604. The boundary 600 runs parallel to the borehole 606 and is offset a short distance (e.g., three inches) from the borehole center at its closest point. The gamma sensor 608 measures gamma rays that are generated in both beds, but the sensitivity to the different beds varies as the tool 610 rotates. API refers to the unit of measure associated with natural gamma measurements, and it is proportional to the measured count rates. It should be understood that other formation data might be collected by other tools or sensors in an analogous fashion.

In FIG. 5, a simulated measurement of natural gamma radiation and its angular dependence is presented according to one illustrated embodiment for the geometry of FIG. 6. FIG. 5 depicts a variation of gamma ray intensity within a formation bed along a sweep of a borehole as modeled by MCNP software code. Individual data points 500 indicate simulated intensity measurements in counts per second (cps) at various angular orientations relative to a reference direction. A solid line 502 represents a predetermined, one-dimensional angular function fitted to the data points 500 using regression analysis. MCNP software code is a standard package developed by Los Alamos National Laboratory to simulate nuclear processes (e.g., neutron, photon, electron, etc.). It is well-accepted in the well-logging industry by those skilled in the art and will not be presented further.

In general, an angular distribution of a formation property along a sweep of a borehole can be approximated by a one-dimensional angular function such as the sinusoidal function:

$$M(\theta)=\Sigma_{i=0}^{N} a_i \cos^i(\theta-\theta_0) \quad \text{(Equation 1)}$$

where $M(\theta)$ is a magnitude of the formation property under measurement;

$\theta$ is an angle of measurement relative to the reference direction, R; and $a_i$ and $\theta_0$ are coefficients determined during a regression analysis to characterize the angular distribution of the formation property. While shown as a cosine-based equation, one skilled in the art will appreciate that this may include a sine-based function that is shifted.

Alternative one-dimensional angular functions may also be used including the following sinusoidal functions:

$$M(\theta)=\Sigma_{i=0}^{N} b_i \sin^i(\theta-\theta_0) \quad \text{(Equation 2)}$$

$$M(\theta)=\Sigma_{i=0}^{N} b_i \cos[i(\theta-\theta_0)] \quad \text{(Equation 3)}$$

where $M(\theta)$, $\theta$, and $\theta_0$ are as before; and $b_i$ are coefficients specific to equations (2) and (3) that are determined during a regression analysis to characterize the angular distribution of the formation property.

Natural gamma-ray spectra, however, are well-represented by the simple, N=2 expansion of equation (1):

$$M(\theta)=a_0+a_1 \cos(\theta-\theta_0)+a_2 \cos^2(\theta-\theta_0) \quad \text{(Equation 4)}$$

In FIG. 5, the solid line 502 is a fitting of equation (4) to the data points 500. As shown therein, the fitting of equation (4) is capable of representing the gamma-ray characteristics of the borehole. Only the coefficients $a_0$, $a_1$, $a_2$, and $\theta_0$ are transmitted to the surface unit. It will be appreciated that the communication of four coefficients, $a_0$, $a_2$, and $\theta_0$, requires notably less transmission bandwidth than that required for all data points 500.

Figure 7:
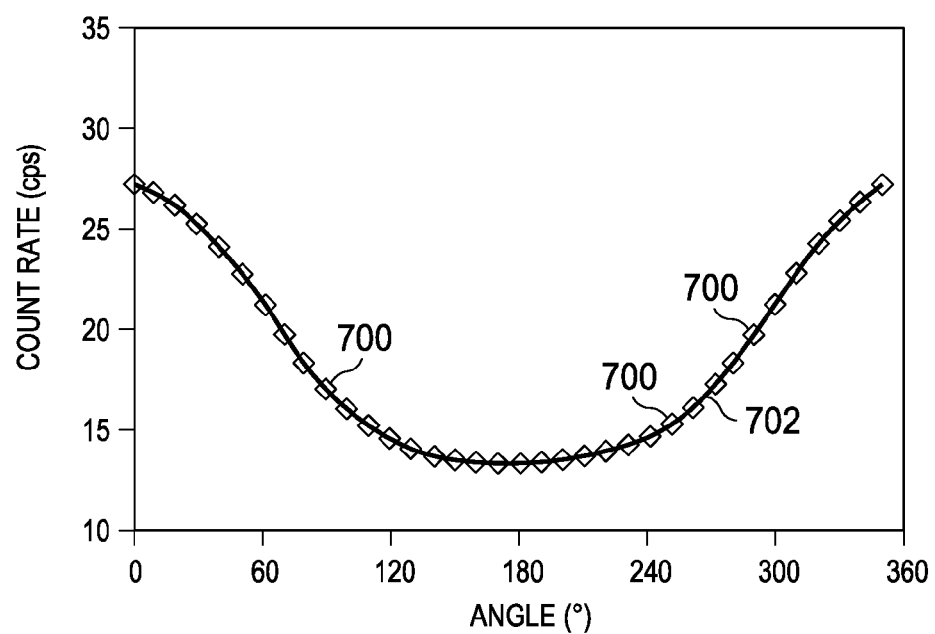
FIG. 7 is a schematic plot of data representing a characteristic of a borehole and having count rate per second (cps) on the ordinate and angle in degrees on the abscissa.
Figure 8:
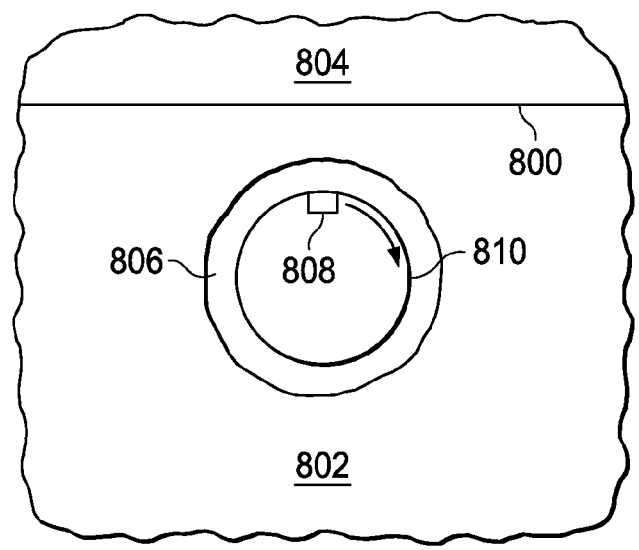
FIG. 8 is a schematic plan view in cross section of a borehole assembly in a borehole comprised of a high-API formation bed and a low-API formation bed.

Now referring to FIG. 7, a second simulated measurement of a gamma-ray intensity and its angular dependence is presented. FIG. 7 is generated using the same formations as FIG. 5 but with the borehole located in the low-API formation with its center a short distance (e.g., three inches) from the closest approach of the bed boundary. FIG. 8 illustrates this configuration which, in similar fashion to FIG. 6, includes the bed boundary 800, the high API bed 802, and the low API bed 804. The borehole 806, sensing tool (e.g., gamma sensor 808), and rotating tool 810 are shown for reference. Individual data points 700 in FIG. 7 indicate simulated intensity measurements (cps) at various angular orientations of the sensor. The gamma ray intensity is lower, compared to that illustrated in FIG. 5, due to the lower radioactivity of the low-API bed. A solid line 702 was computed using equation (4) with coefficients obtained from the data points 700 using regression analysis.

Equations (1)-(3) include one-dimensional angular functions capable of representing formation characteristics of a borehole. FIG. 5 is an example where an equation has been fit to the data using one of the equations. To produce a predetermined function, the number of sinusoidal expansion terms and their associated coefficients are adjusted to match the desired formation property. The plurality of coefficients is finite and less in number than the corresponding data which represents the formation characteristics.

Figure 9:
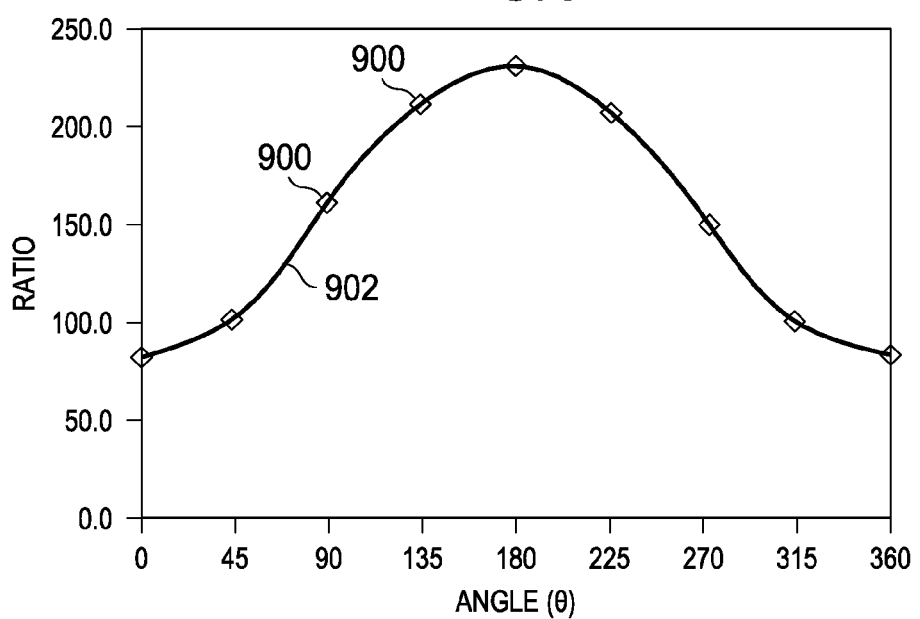
FIG. 9 is a schematic plot of data representing a characteristic of a borehole and having a ratio on the ordinate and angle in degrees on the abscissa.

FIG. 9, as a further example, depicts a variation of neutron intensity along an angular sweep of a borehole as modeled by measured with a physical tool. The formation bed for this model is uniform. Individual data points 900 indicate simulated intensity measurements, quantified by neutron ratios, at respective angles relative to a reference angle. Neutron spectra are well-represented by the simple, N=1 expansion of equation (1) which requires only two coefficients, $a_0$ and $a_1$:

$$M(\theta)=a_0+a_2 \cos(\theta-\theta_0) \quad \text{(Equation 5)}$$

A solid line 902 shows a fitting of equation (5) to the data points 900. It will be appreciated that the communication of two coefficients, $a_0$ and $a_1$, and the reference angle, $\theta_0$, requires notably less transmission bandwidth than that required for all data points 900. In some embodiments, the reference angle may also be transmitted.

Figure 10:
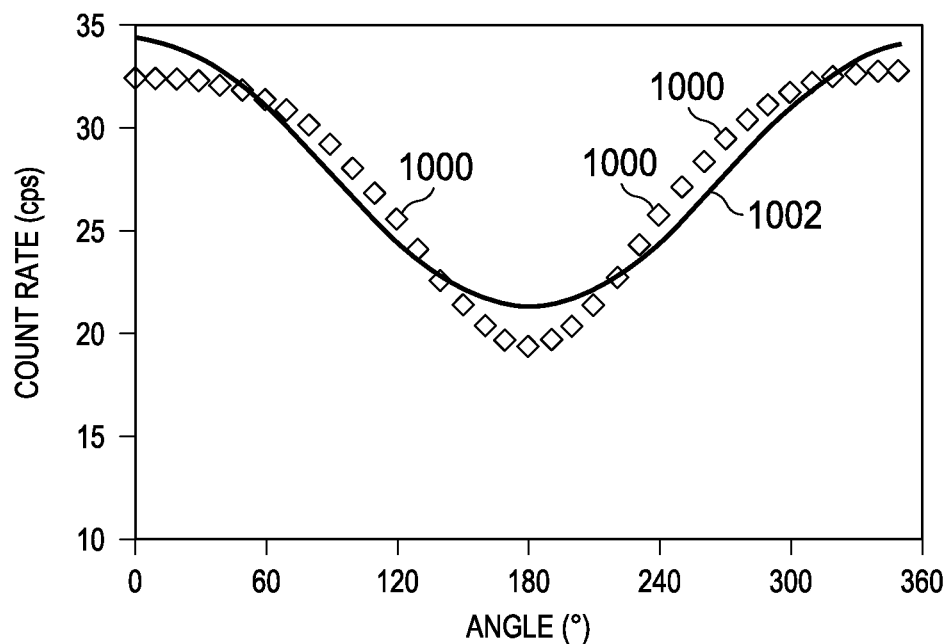
FIG. 10 is a schematic plot of data representing a characteristic of a borehole and having count rate per second (cps) on the ordinate and angle in degrees on the abscissa.
Figure 11:
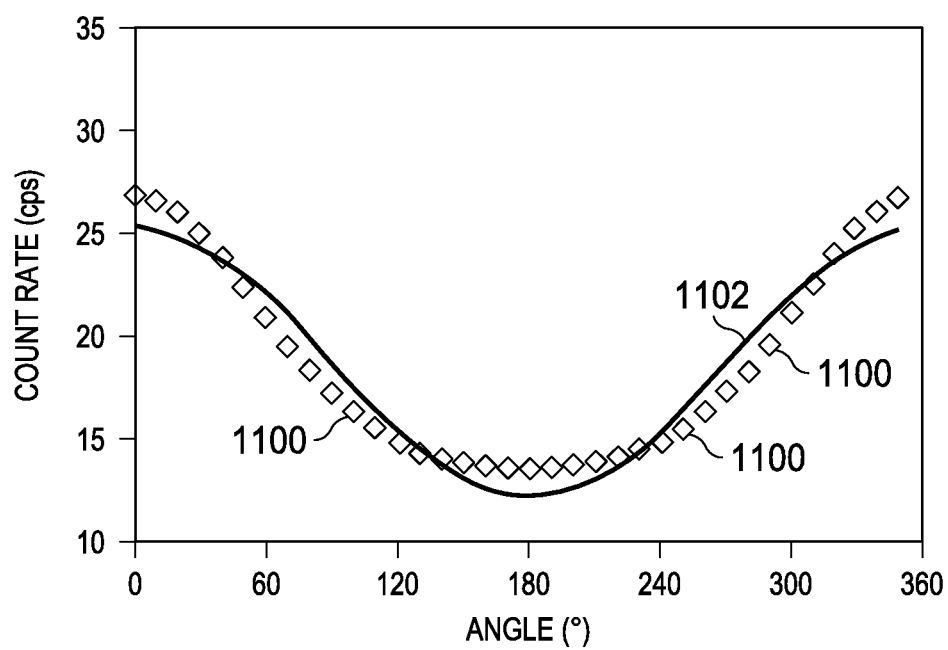
FIG. 11 is a schematic plot of data representing a characteristic of a borehole and having count rate per second (cps) on the ordinate and angle in degrees on the abscissa.

Now referring to FIGS. 10 and 11, a variation of gamma ray intensity within a formation bed along an angular sweep of a borehole is presented according to another illustrative embodiment. The formations and borehole geometry are the same for the borehole associated with FIG. 5 and the same for FIG. 11 as the borehole associated with FIG. 8. In the embodiment of FIGS. 10 and 11, three gamma sensors are modeled as disposed in the borehole. The three gamma sensors are slid longitudinally along the borehole to a desired depth and are substantially fixed in positioned while probing the angular sweep or arc at three respective angles spaced 120° apart. Individual data points 1000 and 1100, respectively, indicate intensity measurements (e.g., cps) that would be measured by a sensor at various angles if the tool were rotating.

The selection of three gamma ray sensors limits the predetermined, one-dimensional angular function to one having no more than three unknowns. FIGS. 10 and 11 indicate a fit of equation (5) to the respective data points 1000 and 1100 with respective solid lines 1002 and 1102. The three unknowns are therefore $a_0$, $a_1$, and $\theta_0$. The solid lines represent the best representation that can be achieved with a three-sensor array. The goodness of fit, however, is less than that illustrated in FIGS. 5 and 7. In some operational contexts, such a reduced accuracy is acceptable. In other embodiments, the goodness of fit is improved by using an additional gamma sensor (i.e., four total) and a predetermined, one-dimensional angular function with four unknowns such as equation (4). While primarily gamma ray sensors have been referenced, other sensor types are possible including porosity sensors, density sensors, resistivity sensors, etc.

Figure 12:
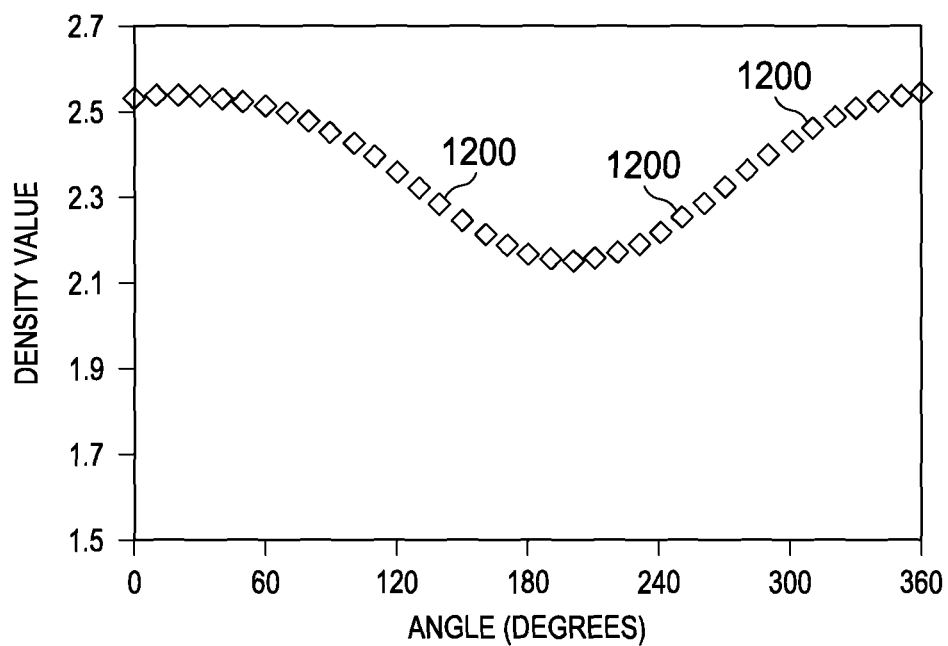
FIG. 12 is a schematic plot of data representing a characteristic of a borehole and having a density value on the ordinate and angle in degrees on the abscissa.
Figure 13:
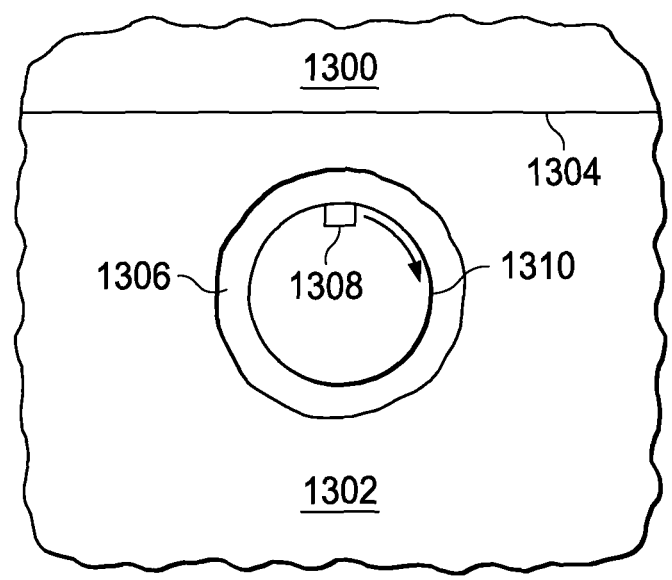
FIG. 13 is a schematic plan view in cross section of a borehole assembly in a borehole comprised of a high-density formation bed and a low-density formation bed.

Now referring to FIG. 12, an illustrated embodiment is presented for a variation of density, represented qualitatively, within a formation bed along a sweep of a borehole. The imagined data is for illustrative purposes to present concepts. Individual data points 1200 indicate density values (e.g., g/cm³) at respective angles relative to a reference angle. A density sensor is modeled as disposed in the borehole adjacent one of two formation beds as shown in FIG. 13. A high-density bed 1300 and a low-density bed 1302 contact at a planar bed boundary 1304 that runs longitudinally parallel to a borehole axis. The borehole 1306 is undistorted (i.e., substantially circular in cross-section). A density sensor 1308 is rotated along an arc length within the borehole 1306 by a rotating tool 1310. As with other embodiments, other sensor types might be used.

Figure 14:
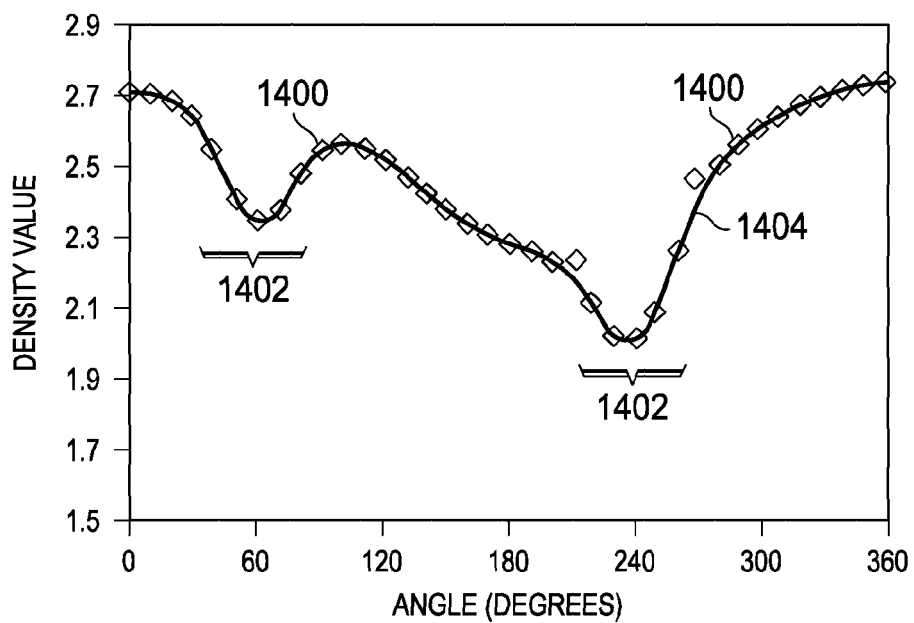
FIG. 14 is a schematic plot of data representing a characteristic of a borehole and having a density value on the ordinate and angle in degrees on the abscissa.
Figure 15:
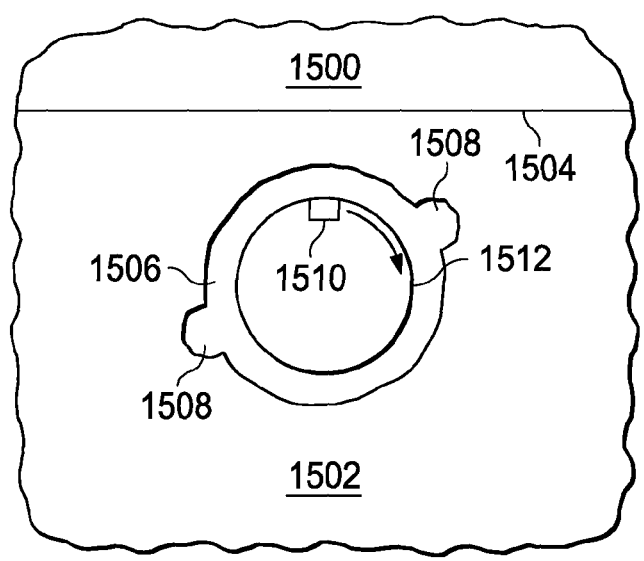
FIG. 15 is a schematic plan view in cross section of a borehole assembly in a borehole comprised of a high-density formation bed and a low-density formation bed, the borehole containing a breakout.

Boreholes, however, may become distorted by non-uniform stresses in the formation. Such distortions, referred to as breakouts by those skilled in the art, can cause measureable deviations from the sinusoidal distribution normally observed with undistorted boreholes. FIG. 14 provides an illustration of an angular density distribution, represented qualitatively, of a borehole with a breakout. The imagined data is for illustrative purposes to present concepts. Individual data points 1400 indicate density values (e.g., g/cm³) at respective angles relative to a reference angle. Dips 1402 in the spectra correspond to the breakout along the angular sweep of the borehole. A solid line 1404 represents a predetermined, one-dimensional angular function fitted to the data points 1400 using regression analysis. A corresponding configuration of the formation and borehole geometry is shown in FIG. 15. In similar fashion to FIG. 13, a high-density bed 1500 and a low-density bed 1502 contact at a planar bed boundary 1504 that runs parallel to a borehole axis. However, the borehole 1506 is distorted by breakouts 1508. A density sensor 1510 or other sensor is rotated along an angular sweep or arc length within the borehole 1506 by a rotating tool 1512.

The presence of breakouts in the borehole hinders the utilization of purely sinusoidal functions of the type previously presented. The number of coefficients required for a series expansion of such functions would approach or exceed the number of data values measured from the borehole. To accommodate deviations caused by breakouts, the sinusoidal functions of equation (1) may be modified by adding a function that characterizes the amplitude, width, and angular position of the breakout. Such a modification produces a one-dimensional, angularly-dependent breakout function as shown below:

$$M(\theta)=\Sigma_{i=0}^{N} a_i \cos^{i}(\theta-\theta_0)+M'(\theta) \quad \text{(Equation 6)}$$

where $M(\theta)$, $\theta$, $\theta_0$, and $a_i$ are as before; and $M'(\theta)$ is a modifying function that characterizes the amplitude, width, and angular position of the breakout.

Other sinusoidal functions such as those represented by equations (2) and (3) may be modified by adding functions in an analogous manner Still, all the equations remain one-dimensional angular functions.

One example of a modifying function, $M'(\theta)$, includes:

$$M'(\theta) = b_1 \left[ e^{-[S(\theta-\theta_1)]^2/2\sigma^2} + e^{-[S(\theta-\theta_1-180°)]^2/2\sigma^2} \right] \quad \text{(Equation 7)}$$

where $$S(\theta) = \begin{bmatrix} \theta+360° & \text{if } \theta < -180° \\ \theta-360° & \text{if } \theta > 180° \\ \theta & \text{if } -180° \leq \theta \leq 180° \end{bmatrix} \quad \text{(Equation 8)}$$

$b_1$ is a coefficient of the function that is determined during a regression analysis along with coefficients of the sinusoidal function to characterize the angular distribution of the formation property. $b_1$ characterizes the amplitude of the breakout;

$\theta_1$ is an angle between the reference direction, R, and a center of the function closest to the reference direction, R, that characterizes the angular position of the breakout; and $\sigma$ is a standard deviation common to both exponential terms (i.e., $e^{-[S(\theta-\theta_1)]^2/2\sigma^2}$ and $e^{-[S(\theta-\theta_1-180°)]^2/2\sigma^2}$) that characterizes the width of the breakout.

In equation (7), the three terms, $b_1$, $\theta_1$, and $\sigma$, are provided to parameterize breakout behavior in the borehole. The bimodal nature of breakouts, as illustrated in FIG. 15, is captured by incorporating two opposing exponential terms displaced 180° relative to each other.

Another example of a modifying function, $M'(\theta)$, includes the following:

$$M'(\theta)=a/(1+b[S(\theta-\theta_1)]^2)+a/(1+b[S(\theta-\theta_1-180°)]^2) \quad \text{(Equation 9)}$$

where a characterizes the amplitude of the breakout; b, the width; and $\theta_1$, the angular position. Other modifying functions are possible.

For an embodiment measuring density formation properties, equation (4) and equation (7) may be combined to produce a breakout function that characterizes deviations caused by breakouts:

$$M(\theta)=a_0+a_1\cos(\theta-\theta_0)+a_2\cos^2(\theta-\theta_0)+ \\ b_1[e^{-[s(\theta-\theta_1)]^2/2\sigma^2}+e^{-[s(\theta-\theta_1-180°)]^2/2\sigma^2}] \quad \text{(Equation 10)}$$

where $M(\theta)$, $\theta$, $\theta_0$, $\theta_1$, $a_0$, $a_1$, $a_2$, $b_1$, and a are as before.

In FIG. 14, the solid line 1404 represents a fitting of equation (9) to the data points 1400, which includes peaks 1402 centered at 60° and 240°. As shown therein, the fitting of equation (9) is capable of representing the density formation characteristics of the distorted borehole. It will be appreciated that the communication of seven terms (i.e., four coefficients, $a_0$, $a_1$, $a_2$, and $b_1$, two angles, $\theta_0$ and $\theta_1$, and the standard deviation, a) requires less transmission bandwidth than that required for all data points 1400.

Figures 16, 17:
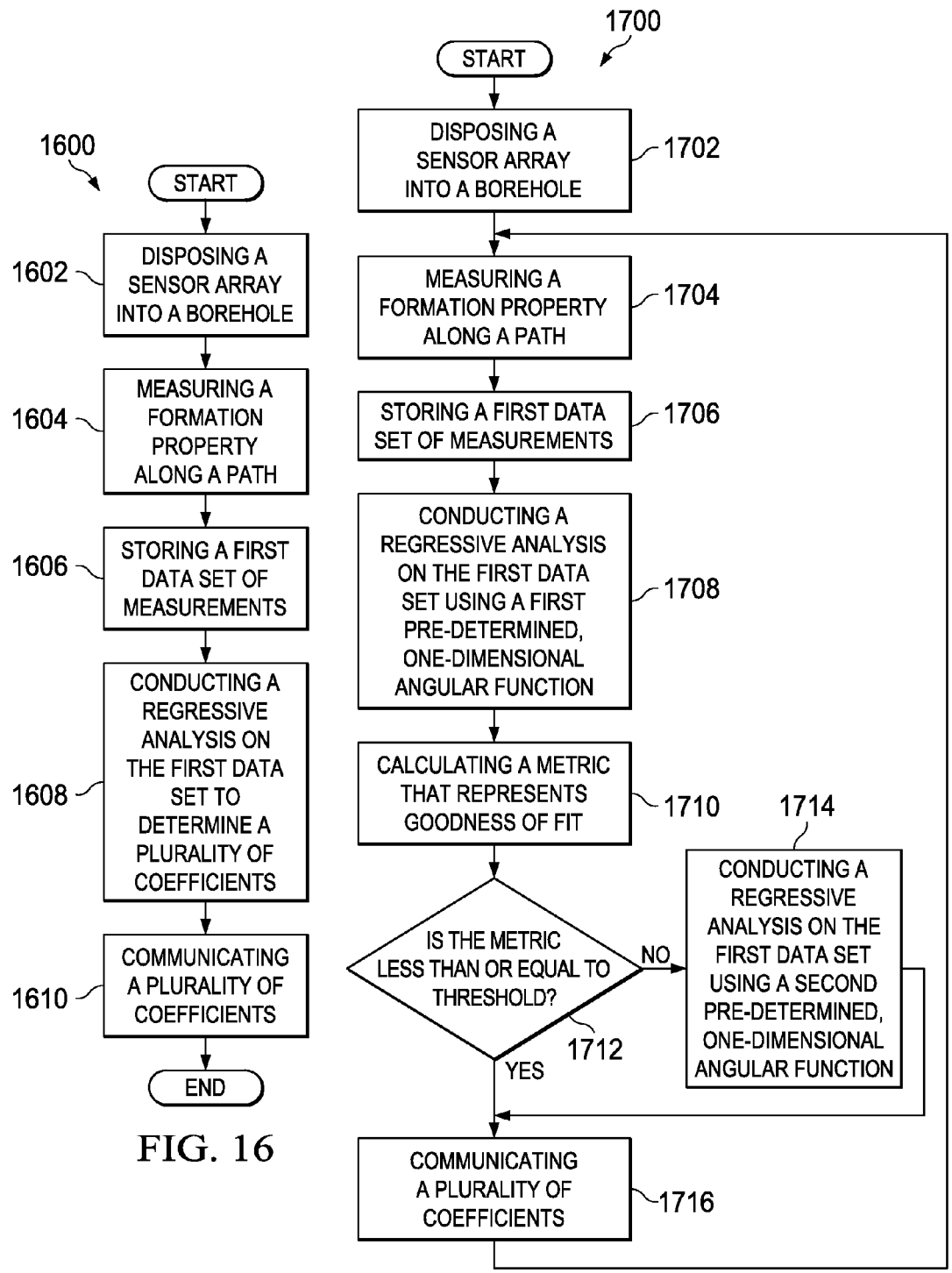
FIG. 16 is a schematic flowchart of an illustrative embodiment of a method for communicating data representing formation characteristics of a borehole from a downhole location to a surface location.
FIG. 17 is another schematic flowchart of an illustrative embodiment of a method for communicating data representing formation characteristics of a borehole from a downhole location to a surface location.

Now referring primarily to FIG. 16, the figure is a schematic flow diagram of an illustrative embodiment of one method 1600 for communicating data representing formation characteristics of a borehole from a downhole location to a surface location. The method 1600 includes the step 1602 of disposing a sensor array into a borehole. The method 1600 also includes the step 1604 of measuring a formation property along a sweep of the borehole. In some embodiments, the step 1604 of measuring the formation property includes rotating the sensor array and probing the borehole along an angular sweep or arc length of rotation. The method also involves the step 1606 of storing a first set of measurements that characterize the formation property along the sweep. The method 1600 also involves the step 1608 of analyzing the first data set using a predetermined, one-dimensional angular function to determine a plurality of coefficients that represent the data.

Regression analysis is a technique to estimate relationships between a dependent variable and one or more independent variables. The best solution is often deemed to yield the smallest chi-squared value between the measured dependent variables and the computed dependent variables, which is called the least-squares method. When equations are linear in the independent variables, analytic solutions are possible, some using a least-squares technique. However, when the equation is nonlinear in one or more variables, an iterative approach may be necessary to obtain the best parameters for the equation. Depending on the problem, it may also be possible to find an analytic solution to a non-linear equation. Step 1608 may utilize either an analytic or iterative solution or other models known to those skilled in the art to determine the plurality of coefficients.

The method 1600 also includes the step 1610 of communicating the plurality of coefficients from a downhole location to a surface location. As part of the step or separate to it, additional information may be communicated such as the reference angle, equation indicator, error, etc. In some embodiments, the method 1600 further involves producing a second data set at the surface by using the plurality of coefficients and the predetermined, one-dimensional angular function and possibly other transmitted data. The second data set represents the first data set. Other methods will be apparent from the description herein.

Now referring primarily to FIG. 17, the figure is a schematic flow diagram of an illustrative embodiment of one method 1700 for communicating data representing formation characteristics of a borehole from a downhole location to a surface location. The method 1700 includes the step 1702 of disposing a sensor array into a borehole. The method 1700 also includes the step 1704 of measuring a formation property along a sweep of the borehole. In some embodiments, the step 1704 of measuring the formation property includes rotating the sensor array and probing the borehole along an angular sweep or arc length of rotation. The method also includes the step 1706 of storing a first set of measurements that characterize the formation property along the sweep. The method 1700 also involves the step 1708 of conducting a regression analysis of the first data set using a first predetermined, one-dimensional angular function to determine a first plurality of coefficients. The method 1700 also includes the step 1710 of calculating a metric that represents goodness of fit of the first predetermined, one-dimensional angular function to the first data set. The metric depends on the statistical model selected for the regression analysis and may include a coefficient of determination, $R^2$, or a weight sum of errors, $\chi^2$ (i.e., a chi-squared test).

The method 1700 also involves comparing the metric to a threshold value as represented by decision block 1712. If the metric is less than or equal to the threshold value, the method 1700 proceeds to step 1716 of communicating a plurality of coefficients to the surface. The communication includes the first plurality of coefficients along with an indication that the first predetermined, one-dimensional angular function was used. Additional information, e.g., error, reference angle, etc., may also be communicated. The process returns to 1704. If the metric is greater than the threshold value, the method proceeds to step 1714 of conducting a regression analysis of the first data set using a second predetermined, one-dimensional angular function to determine a second plurality of coefficients. For example, a breakout function, such as that shown in equation (7), may be used. The method 1700 returns to step 1716 wherein the communication includes the second plurality of coefficients along with an indication that the second predetermined, one-dimensional angular function was used. The process continues to 1704.

The combination of steps 1708, 1710, 1712, and 1714 are operable to select a one-dimensional, angular function from two or more predetermined, one-dimensional angular functions based on goodness of fit. Although the method 1700 has been presented in the context of two such functions, this context is not intended as limiting. Multiple functions are possible (i.e., greater than two). The method 1700 may involve calculating multiple goodness-of-fit metrics, comparing to a threshold value, and selecting the one which best meets the threshold value.

In some embodiments of method 1700, the first predetermined, one-dimensional angular function is selected from the sinusoidal functions represented by equation (1) and the second predetermined, one-dimensional angular function is selected from the breakout functions represented by equation (6). In still further embodiments, the breakout functions represented by equation (6) include modifying functions represented by equations (7) or (8). The ability to select between two functions enables the method 1700 to adjust to the effects of a breakout on the formation properties along the angular sweep of the borehole.

In addition to the illustrative embodiments described above, many examples of specific combinations are within the scope of the disclosure, some of which are presented below.

EXAMPLE 1

A system for communicating data representing formation characteristics of a borehole from a downhole location to a surface location, the system comprising:
- a borehole assembly for moving by rotation or sliding within the borehole;
- a sensor array coupled to the borehole assembly and having one or more sensors to measure a formation property along a sweep of the borehole, wherein data is measured for angles relative to a reference direction, and wherein the sensor array produces a first data set characterizing the formation property along an angular sweep;
- a computational unit, which includes one or more processors and one or more memories, wherein the one or more memories are coupled to the sensor array for storing the first data set, and wherein the computational unit is configured to conduct a regression analysis on the first data set to determine a plurality of coefficients for use in a predetermined, one-dimensional angular function; and
- a telemetry unit coupled to the computational unit, wherein the telemetry unit receives and transmits the plurality of coefficients.

EXAMPLE 2

The system of Example 1, further comprising a surface unit for receiving the plurality of coefficients, and producing a second data set representative of the first data set.

EXAMPLE 3

The system of Example 1, wherein the predetermined, one-dimensional angular function comprises a sinusoidal function and the plurality of coefficients comprises four coefficients.

EXAMPLE 4

The system of Example 3, wherein the sensor array comprises four sensors, each sensor positioned within a quadrant about the borehole assembly.

EXAMPLE 5

The system of Example 1, wherein the predetermined, one-dimensional angular function comprises a sinusoidal function and the plurality of coefficients comprises three coefficients.

EXAMPLE 6

The system of Example 5, wherein the sensor array comprises three sensors, each sensor positioned within a third of the angular sweep.

EXAMPLE 7

The system of Example 1, wherein the predetermined, one-dimensional angular function comprises a one-dimensional, angularly-dependent breakout function.

EXAMPLE 8

A method for communicating data representing formation characteristics of a borehole from a downhole location to a surface location, the method comprising:
  disposing a sensor array into a borehole;
  measuring a formation property along a sweep of the borehole;
  storing a first data set of measurements that characterize the formation property along an angular sweep;
  conducting a regression analysis on the first data set using a predetermined, one-dimensional angular function to determine a plurality of coefficients; and
  communicating the plurality of coefficients from the downhole location to the surface location.

EXAMPLE 9

The method of Example 8, the method further comprising producing a second data set at the surface by using the plurality of coefficients and the predetermined, one-dimensional angular function, wherein the second data set represents the first data set.

EXAMPLE 10

The method of Example 8 or Example 9, wherein measuring a formation property along a sweep of the borehole comprises:
  rotating the sensor array; and
  probing the borehole along an arc length of rotation.

EXAMPLE 11

The method of Example 8, wherein the predetermined, one-dimensional angular function comprises a sinusoidal function and the plurality of coefficients comprises four coefficients.

EXAMPLE 12

The method of Example 8 or Example 9, wherein measuring a formation property along a sweep of the borehole comprises:
  sliding the sensor array along a longitudinal axis of the borehole; and probing the borehole at three or more angles.

EXAMPLE 13

The method of Example 12, wherein:
  the sensor array comprises four sensors, each sensor spaced within a quadrant of the angular sweep;
  each sensor probes the borehole at a different angle;
  the predetermined, one-dimensional angular function comprises a sinusoidal function; and
  the plurality of coefficients comprises four coefficients.

EXAMPLE 14

The method of Example 12, wherein:
  the sensor array comprises three sensors, each sensor spaced within a third of the angular sweep; and
  the predetermined, one-dimensional angular function comprises a sinusoidal function.

EXAMPLE 15

A method for communicating data representing formation characteristics of a borehole from a downhole location to a surface location, the method comprising:
  disposing a sensor array into a borehole;
  measuring a formation property along a sweep of the borehole;
  storing a first data set of measurements that characterize the formation property along the angular sweep;
  selecting a one-dimensional, angular function from two or more predetermined, one-dimensional angular functions based on goodness of fit; and
  communicating a plurality of coefficients of the selected predetermined, one-dimensional angular function from the downhole location to the surface location.

EXAMPLE 16

The method of Example 15, the method further comprising:
  communicating an indication of which of the predetermined, one dimensional angular functions was used to the surface location; and
  producing a second data set at the surface by using the plurality of coefficients and the selected predetermined, one-dimensional angular function, wherein the second data set represents the first data set.

EXAMPLE 17

The method of Example 15 or Example 16, wherein measuring a formation property along a sweep of the borehole comprises:
  rotating the sensor array; and
  probing the borehole along an arc length of rotation.

EXAMPLE 18

The method of Example 15 or any of Examples 16-17, wherein selecting a predetermined, one-dimensional angular function from two or more predetermined, one-dimensional angular functions based on goodness of fit comprises:
  conducting a regression analysis on the first data set using a first predetermined, one-dimensional angular function to determine a first plurality of coefficients for the first predetermined, one-dimensional angular function;

calculating a metric that represents goodness of fit of the first predetermined, one-dimensional angular function to the first data set;

comparing the metric to a threshold value;

if the metric is less than or equal to the threshold value, communicating the first plurality of coefficients to the surface along with an indication that the first predetermined, one-dimensional angular function was used;

if the metric is greater than the threshold value, conducting a regression analysis on the first data set using a second predetermined, one-dimensional angular function to determine a second plurality of coefficients for the second predetermined, one-dimensional angular function, and communicating the second plurality of coefficients to the surface along with an indication that the second predetermined, one-dimensional angular function was used.

EXAMPLE 19

The method of Example 18, wherein the first predetermined, one-dimensional angular function comprises a sinusoidal function and the first plurality of coefficients comprises four coefficients.

EXAMPLE 20

The method of Example 18 or Example 19, wherein the second predetermined, one-dimensional angular function comprises a one-dimensional, angular-dependent breakout function and the second plurality of coefficients comprises seven or more coefficients.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order or simultaneous where appropriate. Where appropriate, aspects of any of the examples described above may be combined with aspects of any of the other examples described to form further examples having comparable or different properties and addressing the same or different problems.

It will be understood that the above description of preferred embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

I claim:

1. A system for communicating data representing formation characteristics of a borehole from a downhole location to a surface location, the system comprising:

a borehole assembly for moving by rotation or sliding within the borehole;

a sensor array coupled to the borehole assembly and having one or more sensors to measure a formation property along a sweep of the borehole, wherein data is measured for angles relative to a reference direction, and wherein the sensor array produces a first data set characterizing the formation property along an angular sweep;

a computational unit, which includes one or more processors and one or more memories, wherein the one or more memories are coupled to the sensor array for storing the first data set, wherein the computational unit is configured to conduct a regression analysis on the first data set to determine a plurality of coefficients for use in a predetermined, one-dimensional angular function to characterize an angular distribution of the formation property, and wherein the plurality of coefficients are representative of the first data set; and a telemetry unit coupled to the computational unit and locatable in the borehole, wherein the telemetry unit is operable to transmit the plurality of coefficients to the surface location to reduce a transmission bandwidth used to transmit the first data set to the surface location.

2. The system of claim 1, further comprising a surface unit for receiving the plurality of coefficients, and producing a second data set representative of the first data set using the plurality of coefficients and the predetermined, one-dimensional angular function.

3. The system of claim 1, wherein the predetermined, one-dimensional angular function comprises a sinusoidal function and the plurality of coefficients comprises four coefficients.

4. The system of claim 3, wherein the sensor array comprises four sensors, each sensor positioned within a quadrant about the borehole assembly.

5. The system of claim 1, wherein the predetermined, one-dimensional angular function comprises a sinusoidal function and the plurality of coefficients comprises three coefficients.

6. The system of claim 5, wherein the sensor array comprises three sensors, each sensor positioned within a third of the angular sweep.

7. The system of claim 1, wherein the predetermined, one-dimensional angular function comprises a one-dimensional, angularly-dependent breakout function.

8. A method for communicating data representing formation characteristics of a borehole from a downhole location to a surface location, the method comprising:

disposing a sensor array into a borehole;

measuring a formation property along a sweep of the borehole;

storing a first data set of measurements that characterize the formation property along an angular sweep;

conducting a regression analysis on the first data set using a predetermined, one-dimensional angular function to determine a plurality of coefficients representative of the first data set and characterized an angular distribution of the formation property; and communicating the plurality of coefficients from the downhole location to the surface location to reduce a transmission bandwidth used to transmit the first data set to the surface location.

9. The method of claim 8, the method further comprising producing a second data set at the surface by using the plurality of coefficients and the predetermined, one-dimensional angular function, wherein the second data set represents the first data set.

10. The method of claim 8, wherein measuring a formation property along a sweep of the borehole comprises:
rotating the sensor array; and
probing the borehole along an arc length of rotation.

11. The method of claim 8, wherein the predetermined, one-dimensional angular function comprises a sinusoidal function and the plurality of coefficients comprises four coefficients.

12. The method of claim 8, wherein measuring a formation property along a sweep of the borehole comprises:
sliding the sensor array along a longitudinal axis of the borehole; and
probing the borehole at three or more angles.

13. The method of claim 12, wherein:
the sensor array comprises four sensors, each sensor spaced within a quadrant of the angular sweep;
each sensor probes the borehole at a different angle;
the predetermined, one-dimensional angular function comprises a sinusoidal function; and
the plurality of coefficients comprises four coefficients.

14. The method of claim 12, wherein:
the sensor array comprises three sensors, each sensor spaced within a third of the angular sweep; and
the predetermined, one-dimensional angular function comprises a sinusoidal function.

15. A method for communicating data representing formation characteristics of a borehole from a downhole location to a surface location, the method comprising:
disposing a sensor array into a borehole;
measuring a formation property along a sweep of the borehole;
storing a first data set of measurements that characterize the formation property along the angular sweep;
selecting a one-dimensional, angular function from two or more predetermined, one-dimensional angular functions, for characterizing an angular distribution of the formation property, based on goodness of fit to the first data set; and
communicating, from the downhole location to the surface location, a plurality of coefficients of the selected predetermined, one-dimensional angular function to reduce a transmission bandwidth used to transmit the first data set to the surface location, wherein the plurality of coefficients are representative of the first data set.

16. The method of claim 15, the method further comprising:
communicating an indication of which of the predetermined, one-dimensional angular functions was used to the surface location; and
producing a second data set at the surface by using the plurality of coefficients and the selected predetermined, one-dimensional angular function, wherein the second data set represents the first data set.

17. The method of claim 15, wherein measuring a formation property along a sweep of the borehole comprises:
rotating the sensor array; and
probing the borehole along an arc length of rotation.

18. The method of claim 15, wherein selecting a predetermined, one-dimensional angular function from two or more predetermined, one-dimensional angular functions based on goodness of fit comprises:
conducting a regression analysis on the first data set using a first predetermined, one-dimensional angular function to determine a first plurality of coefficients for the first predetermined, one-dimensional angular function;
calculating a metric that represents goodness of fit of the first predetermined, one-dimensional angular function to the first data set;
comparing the metric to a threshold value;
if the metric is less than or equal to the threshold value, communicating the first plurality of coefficients to the surface along with an indication that the first predetermined, one-dimensional angular function was used;
if the metric is greater than the threshold value,
conducting a regression analysis on the first data set using a second predetermined, one-dimensional angular function to determine a second plurality of coefficients for the second predetermined, one-dimensional angular function, and
communicating the second plurality of coefficients to the surface along with an indication that the second predetermined, one-dimensional angular function was used.

19. The method of claim 18, wherein the first predetermined, one-dimensional angular function comprises a sinusoidal function and the first plurality of coefficients comprises four coefficients.

20. The method of claim 18, wherein the second predetermined, one-dimensional angular function comprises a one-dimensional, angular-dependent breakout function and the second plurality of coefficients comprises seven or more coefficients.

* * * * *

UNITED STATES PATENT AND TRADEMARK OFFICE
CERTIFICATE OF CORRECTION

| | |
|---|---|
| PATENT NO. | : 9,982,534 B2 |
| APPLICATION NO. | : 15/029226 |
| DATED | : May 29, 2018 |
| INVENTOR(S) | : Gordon L. Moake |

Page 1 of 1

It is certified that error appears in the above-identified patent and that said Letters Patent is hereby corrected as shown below:

In the Claims

Column 16, Line 62, "and characterized" should read -- and characterize --.

Signed and Sealed this
Tenth Day of July, 2018

Andrei Iancu
*Director of the United States Patent and Trademark Office*